(12) United States Patent
Degenhardt

(10) Patent No.: US 11,376,450 B2
(45) Date of Patent: Jul. 5, 2022

(54) OXYGEN SUPPLY DEVICE

(71) Applicant: B/E Aerospace Systems GmbH, Lubeck (DE)

(72) Inventor: Detlev Degenhardt, Stockelsdorf (DE)

(73) Assignee: B/E AEROSPACE SYSTEM GMBH, Lubeck (DE)

( * ) Notice: Subject to any disclaimer, the term of this patent is extended or adjusted under 35 U.S.C. 154(b) by 203 days.

(21) Appl. No.: 16/212,277

(22) Filed: Dec. 6, 2018

(65) Prior Publication Data

US 2019/0175958 A1 Jun. 13, 2019

(30) Foreign Application Priority Data

Dec. 7, 2017 (DE) .......................... 102017222199.2

(51) Int. Cl.
| | |
|---|---|
| *A62B 7/14* | (2006.01) |
| *A62B 9/00* | (2006.01) |
| *A62B 7/02* | (2006.01) |
| *B64D 11/00* | (2006.01) |

(52) U.S. Cl.
CPC .................. *A62B 9/00* (2013.01); *A62B 7/02* (2013.01); *A62B 7/14* (2013.01); *B64D 11/00* (2013.01); *B64D 2231/025* (2013.01)

(58) Field of Classification Search
CPC .... A61M 16/00; A61M 16/0003–0012; A61M 16/06–0694; A61M 16/08–0883; A61M 16/0875; A61M 16/20–029; A61M 2016/0015–0042; A62B 7/00; A62B 7/04; A62B 7/14; A62B 9/00–06; B63C 11/12; B63C 11/18
See application file for complete search history.

(56) References Cited

U.S. PATENT DOCUMENTS

| | | | | |
|---|---|---|---|---|
| 2,999,497 | A * | 9/1961 | Hamilton | A62B 9/00 138/121 |
| 4,669,462 | A | 6/1987 | Marshall | |
| 4,741,333 | A | 5/1988 | Suzuki et al. | |
| 5,265,597 | A * | 11/1993 | Wallis | A62B 18/025 128/205.17 |
| 5,454,061 | A * | 9/1995 | Carlson | B29C 48/12 392/478 |
| 6,420,024 | B1 * | 7/2002 | Perez | B01D 39/1623 428/359 |
| 8,443,802 | B2 | 5/2013 | Schaeffer, Jr. et al. | |
| 2006/0157057 | A1 | 7/2006 | Palmquist | |
| 2008/0308106 | A1 * | 12/2008 | Augustine | A47C 7/744 128/205.29 |

OTHER PUBLICATIONS

Office Action dated Jul. 26, 2018 issued by the German Patent and Trademark Office in parent application No. DE102017222199.2.

* cited by examiner

*Primary Examiner* — Victoria Murphy
*Assistant Examiner* — Ned T Heffner
(74) *Attorney, Agent, or Firm* — Suiter Swantz pc llo

(57) ABSTRACT

The invention relates to an oxygen supply device with an oxygen source and with at least one oxygen mask, said oxygen mask beings conductively connectable to the oxygen source via a connection conduit. At least a section of the connection conduit between the oxygen mask and the oxygen source is formed by a film tube.

11 Claims, 2 Drawing Sheets

_US 11,376,450 B2_

OXYGEN SUPPLY DEVICE

CROSS-REFERENCE TO RELATED APPLICATIONS

This application claims priority from Germany Application No. 102017222199.2 filed Dec. 7, 2017, the entirety of which is incorporated herein by reference.

BACKGROUND

Oxygen sources and oxygen masks as well as tube conduits, although being flexibly bendable transversely to their longitudinal extension, typically retain their hollow-cylindrical shape and demand considerable storage space.

SUMMARY

In one aspect, embodiments of the inventive concepts disclosed herein are directed to an oxygen supply device with an oxygen source and with at least one oxygen mask, said oxygen mask being conductively connectable to the oxygen source via a connection conduit, characterized in that at least a section of the connection conduit is formed by a film tube.

DETAILED DESCRIPTION

Figure 1:
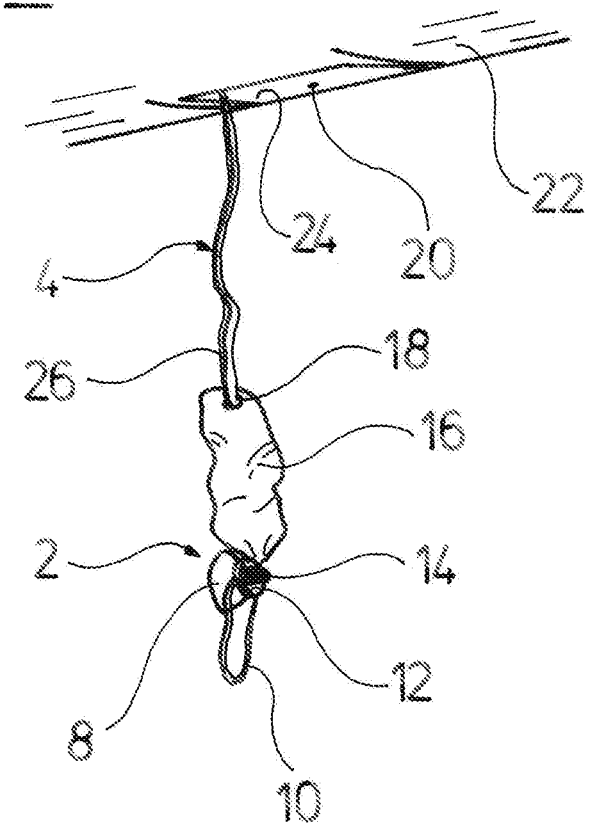
FIG. 1 is a view of an emergency oxygen supply device for the supply of oxygen to a passenger in an aircraft.

The invention relates to an oxygen supply device with the features which are specified in the preamble of claim 1.

Concerning the oxygen supply devices which are discussed here, it is the case of devices which serve for breathing and which for this purpose are equipped with at least one oxygen mask, said oxygen mask being conductively connectable to an oxygen source via a [flexible] tube conduit. Portable oxygen supply devices of this type and which are applied in aircraft and are predominantly envisaged for special emergency situations are usually carried along in containers, from which the oxygen mask or oxygen masks which hang of the tube conduit can be removed only when necessary or, as is the case with emergency oxygen supply devices which are applied in passenger aircraft for the oxygen supply of passengers and service personal, automatically fall down in the case of a pressure drop in the passenger cabin.

With regard to the wearing comfort of a portable oxygen supply device as well as with regard to the restricted installation space in vehicles in the case of an oxygen supply device which is used in a vehicle, it has basically been found to be advantageous for the oxygen supply device to be designed as compactly as possible. However, at odds with this is the fact that not only the oxygen source, but also the oxygen mask or oxygen masks as well as the tube conduit or tube conduits which, although being flexibly bendable transversely to their longitudinal extension, otherwise however essentially retain their hollow-cylindrical shape, demand considerable storage space.

Against the background of such a problem, it is the object of the invention to create an oxygen supply device of the previously described type which requires as low as possible storage space.

This object is achieved by a oxygen supply device with the features which are specified in claim 1, wherein advantageous further developments of this oxygen supply device result from the dependent claims, the subsequent description as well as the drawing. Here, the features which are specified in the dependent claims, advantageously in the specified combination, but also, inasmuch as makes technical sense, per se or in other combinations, can contribute to embodiments of the invention.

The inventive oxygen supply device which comprises at an oxygen source and at least one oxygen mask which is conductively connectable to the oxygen source via a connection conduit is characterized in that at least a section of the connection conduit from the oxygen source to the oxygen mask is formed by a film tube. Here, a film tube is to be understood as a tube whose peripheral wall is formed by a thin, typically gas-impermeable film which in the absence of a pressure prevailing in the inner lumen of the tube has no intrinsic stability transverse to the longitudinal extension of the tube and thus collapses in the absence of an inner pressure in the tube, so that the volume of the tube significantly reduces. Accordingly, the film tube takes up significantly less space when no oxygen is led through it from the oxygen source to the oxygen mask, which is to say when the oxygen supply device is not in use, than is the case with the shape-stable tubes which have been used until now in combination with oxygen supply devices and which always essentially retain their hollow-cylindrical shape. A oxygen supply device which on being stowed requires significantly less storage space, which is to say is designed significantly more compactly, compared to comparable known oxygen supply devices, results from this, and this is advantageous, particularly in the case of portable oxygen supply devices and those which are applied in aircraft. Here, the significantly lower weight of the film tube can also have positive effects compared to a shape-stable tube of an equal length. A further advantage of the use of a film tube is to be seen in the fact with this, due to the shape condition of the tube (collapsed or inflated), one can immediately recognise whether oxygen flows from the oxygen source to the oxygen mask or whether an oxygen outlet valve of the oxygen source is correctly opened. The film tube thus acts as a flow indicator so that one can make do without a separate flow indicator device which is otherwise to be arranged in the connection conduit between the oxygen source and the oxygen mask.

The oxygen supply device according to the invention is preferably an emergency oxygen supply device for an aircraft. This emergency oxygen supply device is preferably envisaged for providing passengers and crew with oxygen in the case of a sudden pressure drop in the passenger cabin. As with the emergency oxygen supply devices which have been used up to now, the emergency oxygen supply device according to the invention can also be arranged in a container which is arranged at the ceiling side of the passenger cabin and preferably in a container of a passenger service unit which is arranged in the ceiling region of the passenger cabin, and can serve for the oxygen supply of several passengers who are seated next to one another in a row.

Accordingly, the oxygen supply device according to the invention, apart from an oxygen source can preferably have several oxygen masks which are each conductively connectable to the oxygen source via a tube conduit and given a pressure drop in the passenger cabin fall out of the container due to gravity after the automatic opening of a cover which closes the container. It is particularly with such emergency oxygen supply devices which are provided with several oxygen masks that the use of film tubes for the conduit connection of the oxygen source to the oxygen masks has been found to be particularly advantageous, since the film tubes simplify the equipping of the container with the tubes and the oxygen masks due to the reduced spatial requirement and permit an arrangement of the tubes in the container, with regard to which these cannot tangle with one another, so that the oxygen masks are immediately operationally readily for application by the users.

With regard to a particularly compact design of the oxygen supply device according to the invention, according to a further advantageous further development of the invention, one envisages the film tube extending from the connection of the oxygen source up to a connection which is formed on the oxygen mask. This means that preferably the complete conduit connection between the at least one oxygen mask and the oxygen source is formed by a film tube which on the one hand is fastened to an oxygen outlet of the oxygen source and on the other hand to an oxygen inlet of the oxygen mask.

The film which is used for forming the film tube is at least capable of withstanding the oxygen pressure which prevails in the inner lumen of the film tube given the application of the oxygen supply device, which is to say that the dimensioning and the material characteristics of the film which forms the peripheral wall of the film tube are such that the film is not destroyed by the oxygen pressure in the inside of the film tube. Usefully however, it is also to be ensured that the film tube also withstands those forces which act upon it externally, or it is to be ensured that such external forces cannot act upon the film tube at all. This particularly applies to tensile (pull) forces which act upon the film tube and which can occur when the user of the oxygen supply device pulls the oxygen mask toward himself, given an unmoved oxygen source. It is particularly in such situations that the oxygen supply device according to the invention advantageously comprises at least one tension element for the strain relief of the film tube, said tension element being fastened at the oxygen mask side and at the oxygen source side. Additionally or alternatively, the tension element can also form a sharp-bend and/or kink protection for the film tube, in order to ensure that the inner lumen remains continuous. The tension element, with regard to which it is usefully the case of a thin wire or a cord, with an adequate tensile strength and preferably with a limpness which is comparable to the limpness of the film tube, is usefully designed somewhat shorter than the film tube, so that no tensile forces act upon the film tube when the tension element is tensioned. The tension element can also have a greater intrinsic stiffness, in order to ensure the sharp-bend protection, depending on the function it is primarily a case of. Such a tension element for example can be formed for example by an elastic, but intrinsically stiff wire, which is to say a thin cord of metal or plastic.

The tension element can be arranged outside the film tube or also, as an alternative to this, can be led through the film tube. In both cases, it is to be ensured that the tension element is freely movable with respect to the film tube at least in its longitudinal direction, so that no forces can be transmitted onto the film tube in the case of a tensile loading of the tension element. An arrangement of the tension element outside the film tube as well as a tension element which is led through the film tube entails certain advantages. A tension element which is arranged outside the film tube does not therefore reduce the flow cross section of the film tube in contrast to a tension element which is led through the inner lumen of the film tube, and this film tube can therefore be designed in a particularly slimline manner. A tension element which is led through the film tube however is more favourable in view of the fact that it retains a certain flow channel in the inner lumen of the film tube in the case of a sharp bend which is to say creasing of tube, via which flow channel oxygen can get from the oxygen source to the oxygen mask.

This advantage is particularly brought to the fore if, as is envisaged according to a further advantageous further development of the invention, two tension elements are led through the film tube in a manner distanced to one another. Accordingly, two tension elements are led through the inner lumen of the film tube at a certain distance and hereby are usefully fastened distanced to one another at the oxygen mask side end at the oxygen source side. This embodiment entails the additional advantage that it helps prevent a kinking of the folded-together film tube, which is to say the film tube which is not subjected to the inner pressure.

The film tube which forms at least a part of a connection conduit between the oxygen source and the oxygen mask is connected to a breathing bag of the oxygen mask. Here, the breathing bag is connected with its oxygen outlet to the oxygen inlet of a mask body of the oxygen mask in the usual manner, whereas the oxygen inlet of the breathing bag is connected to the film tube via a connection element. Concerning the preferably envisaged use of a tension element for the straight relief of the film tube, this tension element can be fastened at the oxygen mask side to the connection element which serves for the connection of the breathing bag and film tube. However, this fastening of the tension element necessitates the breathing bag having such a tensile strength that it itself can accommodate tensile forces which possible act upon the tension element, without this leading to a damage of the breathing bag. If this is not the case, a tension element which is led through the film tube can also be provided, said tension element also being led through the breathing bag and being fastened to a connection element of the mask body which serves for the connection of the breathing bag. In this case, the length of the tension element is typically greater than the length of the film tube, here however shorter than the added length of the film tube and the breathing bag.

Breathing bags which are used in combination with oxygen masks are usually designed in a flexurally limp manner, so that they largely collapse which is to say cave in on themselves when no inner pressure prevails in them. With regard to this therefore, the breathing bags have the same material characteristics as the film tube which is used according to the invention. Making the most of this situation, according to a further advantageous embodiment of the oxygen supply device according to the invention, one envisages the film tube forming at least part of the breathing bag of the oxygen mask.

It is particularly in this case that the film tube usefully comprises a cross-sectional widening at its end which is towards the oxygen mask. The end section of the film tube which is adjacent to the oxygen mask can assume the function of the otherwise separately provided breathing bag on account of the enlargement of the inner lumen of the film tube which is entailed by the widening of the cross section, so that one can possibly make do without such a separate breathing bag.

Figure 2:
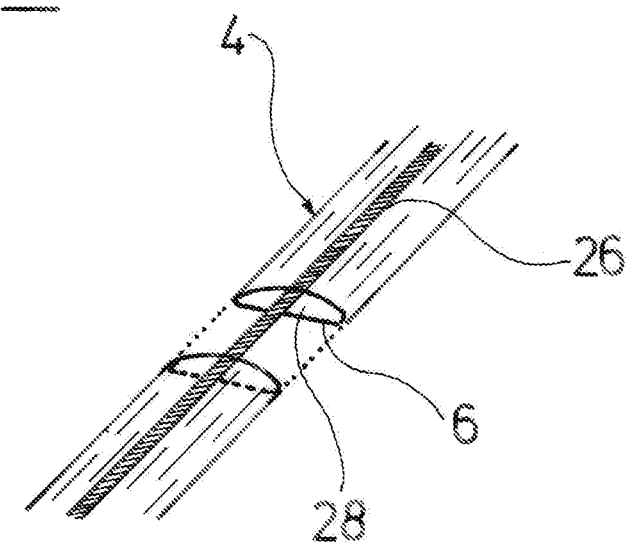
FIG. 2 is a view of a section of a film tube which is used in combination with the emergency oxygen supply device according to FIG. 1.
Figure 3:
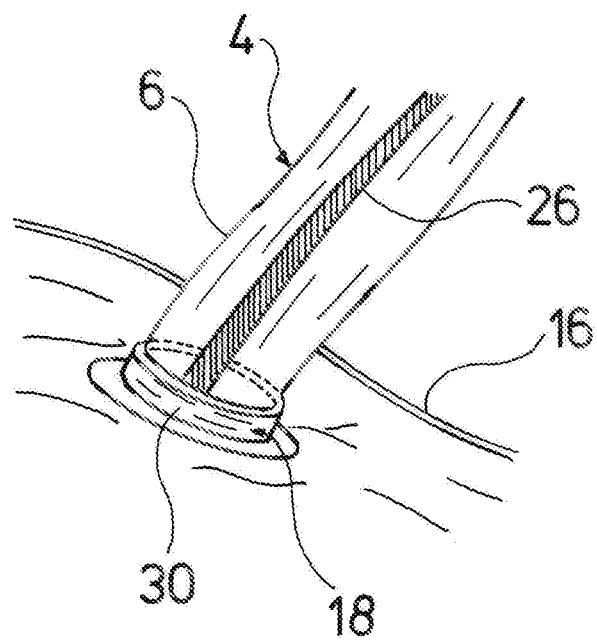
FIG. 3 is a view of the connection of the film tube according to FIG. 2 to a breathing bag of an oxygen mask.
Figure 4:
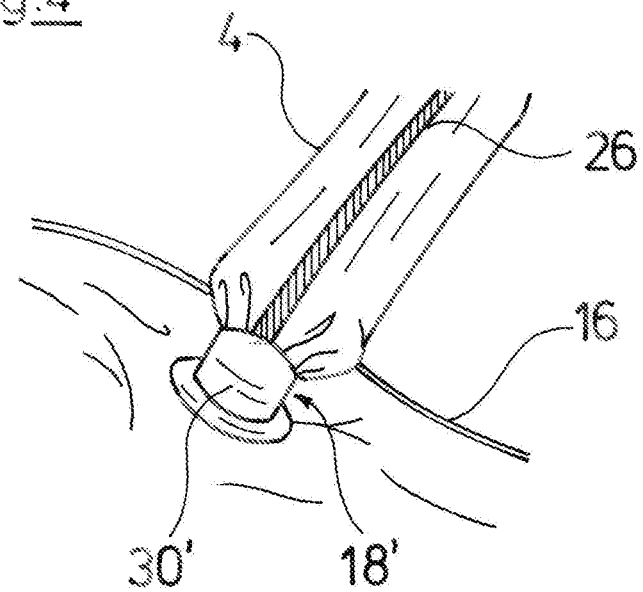
FIG. 4 is a view of the connection of the film tube according to FIG. 2 to a breathing bag of an oxygen mask according to a second embodiment.

The invention is hereinafter explained in more detail by way of an embodiment example which is represented in the drawing. What is shown perspectively and in a schematically simplified manner and to different scales in the drawings are:

FIG. 1 an emergency oxygen supply device for the supply of oxygen to a passenger in an aircraft, FIG. 2 a section of a film tube which is used in combination with the emergency oxygen supply device according to FIG. 1, FIG. 3 the connection of the film tube according to FIG. 2 to a breathing bag of an oxygen mask and FIG. 4 the connection of the film tube according to FIG. 2 to a breathing bag of an oxygen mask according to a second embodiment.

The oxygen supply device which is represented in the drawing is an emergency oxygen supply device for an aircraft, but it should be noted that the now subsequent embodiments, disregarding the details related to the arrangement of the emergency oxygen supply device in an aircraft, are also valid for any oxygen supply device which is applied for breathing purposes.

The emergency oxygen supply device which is represented in FIG. 1 in the activated condition serves for the oxygen supply of a passenger in an aircraft. This emergency oxygen supply device comprises an oxygen source which is not evident from the drawing and to which an oxygen mask 2 is connected via a tube conduit. The tube conduit which connects the oxygen mask 2 to the oxygen source is formed by a film tube 4 which, likewise not evident from the drawing, is connected with one end to the oxygen source. The peripheral wall 6 of the film tube 4 is formed by a thin-walled film which is formed from a pressure-resistant and gas permeable material such as e.g. polyurethane and has quasi has no intrinsic stability.

The oxygen mask 2 comprises a mask body 8 which a passenger who is to be supplied with oxygen brings into a position covering his mouth and his nose and fixes it in this position by way of a holding band 10 which is laid around the head. An oxygen inlet 14 is formed at a face side 12 of the mask body 8 which is designed in a closed manner and which is away from the face of the user on use of the oxygen mask 2. A breathing bag 16 is connected with its oxygen outlet to this oxygen inlet 14 of the mask body 8. The film tube 4 is fastened to the breathing bag 16 via a connection element 18, at an oxygen inlet of the breathing bag 16 (FIG. 3).

The oxygen mask 2 and the film tube 4 together with the oxygen source, with regard to which it can selectively be the case of an oxygen bottle or a chemical oxygen generator, are stored in a container 20 in the normal case, which is to say when the use of the emergency oxygen supply device is not necessary, wherein this container is integrated into a ceiling panel 22 of the passenger cabin of the aircraft, said panel being arranged above the seating location of the possible user of the emergency oxygen supply device. Given a pressure drop in the passenger cabin, the oxygen mask 2 hanging on the film tube 4 drops out of the container 20 via an opening 24 which is towards the user of the emergency oxygen supply device but which is otherwise closed by a non-represented cover. The user can now pull the oxygen mask 2 to himself and apply it.

A tension element 26 is provided, in order to prevent the pull/tensile force which is necessary for pulling the oxygen mask 2 from acting upon the film tube 4. In the present case, with regard to the tension element 26, it is the case of a thin, flexible wire of stainless steel, but it should be noted that the tension element 26 as an alternative to this can also be formed by a wire or cord of another tensionally strong material, such as e.g. plastic. It is particularly evident from FIG. 2 that the tension element 26 is led through an inner lumen 28 of the film tube. It cannot be recognised from the drawing that the tension element 26, whose length is somewhat smaller than the length of the film tube 4, is fastened with one end to the oxygen inlet of the oxygen source and with its other end to the connection element 18.

The connection element 18 which is represented in FIG. 3 is fastened to one end of the breathing bag 16, said end being directly away from the mask body 8 given an arrangement of the breathing bag 18 on the mask body 8 of the oxygen mask 2, and forms a flow channel from the outside of the breathing bag 18 to the inside of the breathing bag. A part of this flow channel is formed by a sleeve 30 which is formed on the connection element 18 and which projects outside the breathing bag 16 given an arrangement of the connection element 18 on the breathing bag 16. The inner diameter of the sleeve 30 is dimensioned such that is corresponds to the outer diameter of the film tube 4 in its inflated condition. The film tube 4 is inserted into the sleeve 30, wherein its peripheral wall 6 bears on the inner periphery of the sleeve 30 in a flush, which is to say aligned manner. The film tube 4 is connected to the connection element 30 in a pressure-tight manner in this position.

A connection element 18' is represented in FIG. 4 as an alternative to the connection element 18 which is represented in FIG. 3. The connection element 8' merely differs from the connection 18 with regard to its dimensioning. Thus the sleeve 30' of the connection element 18' has a smaller inner and outer diameter than the sleeve 30 of the connection element 18, which results in the end of the film tube 4 which is provided for fastening to the connection element 18' being gathered on introduction into the sleeve 30.

LIST OF REFERENCE NUMERALS

2—oxygen mask
4—film tube
6—peripheral wall
8—mask body
10—holding band
12—face side
14—oxygen inlet
16—breathing bag
18, 18'—connection element
20—container
22—ceiling panel
24—opening
26—tension element
28—inner lumen
30, 30'—sleeve

What is claimed is:

1. An oxygen supply device with an oxygen source and with at least one oxygen mask, said oxygen mask being conductively connectable to the oxygen source via a connection conduit, characterized in that at least a section of the connection conduit is formed by a film tube, wherein the film tube has a peripheral wall formed by a gas-impermeable film which in the absence of a pressure prevailing in an inner lumen of the film tube has no intrinsic stability transverse to a longitudinal extension of the film tube and thus collapses in an absence of an inner pressure in the film tube, wherein the gas-impermeable film is formed of polyurethane, wherein the oxygen supply device is an emergency oxygen supply device integrated into a portion of an aircraft, wherein the oxygen supply device is characterized in that at least one tension element for strain relief and/or as a sharp-bend protection of the film tube is provided, said at least one tension element being fastened at a mask side of the film tube and at an oxygen source side of the film tube, wherein each of the at least one tension element is freely movable with respect to the film tube at least in the film tube's longitudinal direction such that no forces are transmitted onto the film tube in a case of a tensile loading of said tension element, wherein the oxygen supply device is characterized in that characterized in that the film tube is connected to a breathing bag of the oxygen mask and each of the at least one tension element is longer than the film tube, wherein each of the at least one tension element is further led through the breathing bag or along an outside of the breathing bag, wherein each of the at least one tension element is shorter than a combined length of the film tube and the breathing bag such that that no tensile forces act upon the film tube and the breathing bag when said tension element is tensioned.

2. The oxygen supply device according to claim 1, characterized in that the film tube forms at least a part of the breathing bag of the oxygen mask.

3. The oxygen supply device according to claim 2, characterized in that the film tube has a cross-sectional widening at its end which is towards the oxygen mask.

4. The oxygen supply device according to claim 1, characterized in that the at least one tension element is at least one wire or at least one cord.

5. The oxygen supply device according to claim 4, characterized in that the at least one tension element is composed of at least one metal.

6. The oxygen supply device according to claim 4, characterized in that the at least one tension element is composed of at least one plastic.

7. The oxygen supply device according to claim 1, characterized in that the film tube extends from a connection of the oxygen source to a connection which is formed on the oxygen mask.

8. The oxygen supply device according to claim 1, characterized in that the at least one tension element is arranged outside the film tube.

9. The oxygen supply device according to claim 1, characterized in that the at least one tension element is led through the film tube.

10. The oxygen supply device according to claim 1, characterized in that two tension elements are led through the film tube in a manner distanced to one another.

11. The oxygen supply device according to claim 1, wherein the film tube is a flow indicator that indicates that there is a flow if the film tube is inflated and that indicates there is no flow if the film tube is collapsed.

* * * * *